United States Patent
Jones (10) Patent No.: US 8,409,389 B2
(45) Date of Patent: Apr. 2, 2013

(54) METHOD AND APPARATUS FOR ADHESIVE BOND CURING

(75) Inventor: Gary E. Jones, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 815 days.

(21) Appl. No.: 11/638,188

(22) Filed: Dec. 13, 2006

(65) Prior Publication Data

US 2010/0224310 A1 Sep. 9, 2010

(51) Int. Cl.
B29C 70/74 (2006.01)

(52) U.S. Cl. ............ 156/245; 156/583.1; 264/257; 264/259; 425/403.1; 425/501; 425/502; 425/509; 425/111

(58) Field of Classification Search ........ 425/403.1, 425/501, 502, 508, 509, 110, 111; 264/345, 264/347, 257, 258, 259; 156/245, 583.1, 156/583.91, 172; 416/229 R, 230, 241 A
See application file for complete search history.

(56) References Cited

U.S. PATENT DOCUMENTS

| | | | | |
|---|---|---|---|---|
| 3,047,051 | A * | 7/1962 | Matveeff | 156/539 |
| 4,095,322 | A * | 6/1978 | Scarpati et al. | 29/889.6 |
| 4,316,701 | A * | 2/1982 | Scarpati et al. | 416/226 |
| 4,365,547 | A * | 12/1982 | McClure, Jr. | 100/38 |
| 4,993,937 | A * | 2/1991 | Ginnasi | 425/444 |
| 5,248,242 | A * | 9/1993 | Lallo et al. | 416/226 |
| 5,296,173 | A | 3/1994 | Dornan | |
| 6,878,230 | B2 * | 4/2005 | Abe et al. | 156/304.5 |

FOREIGN PATENT DOCUMENTS

| | | |
|---|---|---|
| WO | 0047428 | 8/2000 |
| WO | 2008118221 | 10/2008 |
| WO | PCT/US2007/085836 | 10/2008 |

OTHER PUBLICATIONS

International Searching Authority, "International Search Report," issued in connection with international application serial No. PCT/US2007/085836, issued Oct. 10, 2008, 2 pages.
International Searching Authority, "Written Opinion of the International Searching Authority," issued in connection with international application serial No. PCT/US2007/085836, issued Oct. 10, 2008, 5 pages.
The International Bureau, "International Preliminary Report on Patentability," issued in connection with international application serial No. PCT/US2007/085836, issued Jun. 16, 2009, 6 pages.

* cited by examiner

Primary Examiner — Richard Crispino
Assistant Examiner — Robert Dye
(74) Attorney, Agent, or Firm — Hanley, Flight & Zimmerman, LLC (57) ABSTRACT

Portable apparatus for curing a part includes a wheeled frame having sliding part supports that move the part from a loading position to a curing position. A part clamping assembly is slidably mounted on the frame to apply clamping pressure to the part when the part is in the curing position in order to compact the part during a cure cycle. The clamping assembly includes a set of electrically heated shoes that heat the part to a cure temperature. A fan is provided to accelerate cool down the part after curing is complete. The heating and cooling operations are automatically performed by a programmed controller.

21 Claims, 9 Drawing Sheets

FIG. 18

METHOD AND APPARATUS FOR ADHESIVE BOND CURING

FEDERALLY SPONSORED RESEARCH OR DEVELOPMENT

This invention was made with Government support under contract number DAAH23-01-G-00240082 awarded by the United States Army. The Government has certain rights in this invention.

TECHNICAL FIELD

This invention generally relates to processes for manufacturing composite material parts, and deals more particularly with a method and apparatus for curing bonded materials such as laminated plies of reinforced resin.

BACKGROUND

In manufacturing parts formed from composite materials such as laminated plies of fiber reinforced resins, it is often necessary to bond materials or components at various locations on a part. For example, in the case of a rotor blade for aircraft, it may be necessary to bond additional reinforcing layers of a fiber reinforced resin material in the area where the blade is to be attached to a drive shaft. In the past, the curing of adhesive bonds on parts such as a rotor blade require the use of cranes to move the rotor blade as well as specialized fixtures which were labor intensive to assemble and disassemble. A crane was used to move the rotor blade onto a table where it was oriented horizontally in order to allow components or reinforcements to be bonded to the blade. Specialized tooling and hand wrenches were required to draw down fasteners which clamped the reinforcements/components to the blade. This process was time consuming, required careful alignment of the parts and left open a possibility that too much or too little pressure was applied to the clamped parts. Following clamping, the entire blade was moved by a crane to a large oven in order to complete the heat cure process. The entire process of assembling, heating and cooling the components suffered from long flow times, was not ergonomically friendly and consumed a relatively high amounts of energy since a large oven was required to heat the entire blade.

Accordingly, there is a need for a method and apparatus for adhesive bond curing that reduces processing time, provides controllable, consistent results and is more energy efficient. The present invention is directed toward satisfying this need.

SUMMARY

According to one aspect of the invention, apparatus is provided for compacting and curing a composite material part. The apparatus comprises a frame and at least one support on the frame for supporting the part in a desired orientation. A pair of clamping members are disposed on opposite sides of the part and are mounted on the frame for sliding movement toward and away from each other. A pair of shoes respectively connected to the clamping members are heated to a temperature sufficient to cure the part. Means are provided for drawing the clamping members toward each other to apply pressure to the part. In one embodiment, a lead screw and hand wheel are used to draw the clamping members into engagement with the part. The support is slideably mounted on a rail, and slides from a first, loading position in which the part may be loaded onto the support, to a curing position in which at least a portion of the part is positioned between the clamping members. Tool members are carried on the shoes which have surface features that conformally engage opposing surfaces of the part. A pressure sensor in the form of a load cell is used to sense the pressure applied to the part by the clamping members. A temperature sensor senses the temperature of the part. A programmed controller controls the temperature of the heated part during curing, and activates a fan to accelerate cool down of the part after the curing cycle is complete.

In accordance with another aspect of the invention, apparatus is provided for curing a part formed of laminated layers of composite material. The apparatus includes a frame and a support for supporting the part on the frame. The part support is slideably mounted on the frame for linear displacement along a first axis between a first position in which the part may be loaded or unloaded, and a second position in which the part may be cured. A clamping assembly includes a pair of part clamping members supported on the frame for displacement along a second axis transverse to the first axis. The clamping members are displaceable along the second axis between a standby position and a part clamping position. The clamping assembly may also include means for heating the part while the part is clamped. Means are provided for cooling the part after the part has been cured. A controller is used for controlling the operation of the heating and cooling means so that the curing cycle and cool down period are automatically controlled. A pressure sensor senses the pressure applied to the part by the clamping members so that an operator may verify the level of compacting pressure that is applied to the part. A temperature sensor is used for sensing the temperature of the part and feeding back temperature information to the controller.

In accordance with still another aspect of the invention, a method is provided for curing a laminated resin part, comprising the steps of: loading the part onto a support; sliding the support having the part thereon along a first axis from a part loading position to a part curing position; applying pressure to the part by moving a pair of clamping members along a second axis transverse to the first axis from a standby position to a clamping position in which the clamping members engage opposite faces of the part; heating the part through the clamping members to cure the part; cooling the part after the part has been cured; and, releasing pressure applied to the part by moving the clamping members from the clamping position to the standby position.

The method and apparatus of the present invention integrate the compacting, heating and curing operations into a single apparatus that operates at least semi-automatically and is readily portable. Energy consumption is reduced since only localized heating of the part is employed. Part supports allow the part to be loaded onto the apparatus and held in a desired orientation on a repeatable basis. Pre-aligned slide assemblies assure that the parts are quickly clamped and that pressure is uniformly applied to the part.

These and further features, aspects and advantages of the invention will become better understood with reference to the following illustrations, description and claims.

DETAILED DESCRIPTION

Referring to FIGS. 1-16, the present invention relates to apparatus for curing manufactured parts formed from composite materials that require compaction and heating to cure the material. The composite materials may comprise, by way of example, laminated layers of a fiber reinforced resin matrix in which multiple plies of a woven or knitted fabric or tape are layered upon each other. When the plies are compacted and subjected to elevated temperature, resin migrates and solidifies to form a solid, cohesive structure. One example of such composite materials is a carbon fiber reinforced epoxy laminated structure.

In some cases, it may be desirable to bond components or additional layers of fiber reinforced resin materials over an existing part in order to reinforce the part at particular locations or form structural features such as attachment or mounting elements. The types of composite material parts described above are commonly used in the aerospace industry for structural members and rotor blades used to propel helicopters.

In accordance with the present invention, reinforcements or components may be bonded to a section of a rotor blade 32 which is formed, for example of laminated plies of carbon fiber reinforced epoxy. In the illustrated embodiment, reinforcement layers and fittings are bonded to one end of the rotor blade 32 which is adapted to be mounted on the drive shaft of a helicopter.

The apparatus includes an elongate steel frame 20 having spaced apart legs 22 supported by wheels 24 which allow the apparatus to be portable. A rail 26 is secured to the upper side of the frame 20 and has slideabley mounted thereon a pair of spaced apart, part supports 28, 30, respectively. Each of the supports 28, 30 includes a way 62 within which the rail 26 is captured. A pair of stops 48, 50 respectively limit the displacement of supports 28, 30 to outer limits of travel along the rail 26. As best seen in FIGS. 4-7, support 28 includes an opening 58 in the upper surface thereof which is contoured to match an edge of the rotor blade 32. A pair of locator pins 60 having a circular cross section are located near the bottom of the opening 58, which function to locate the blade edge within the opening.

Figure 1:
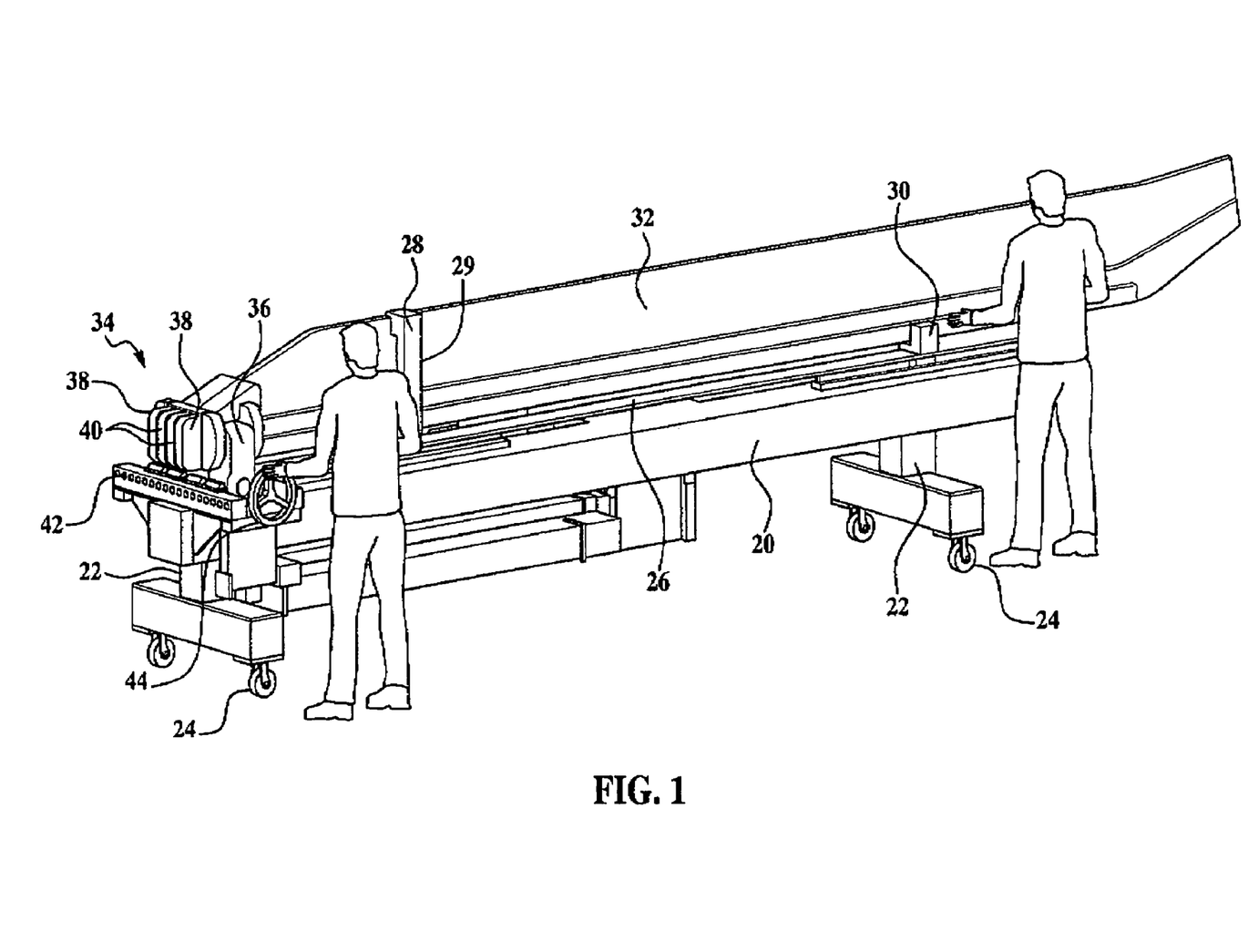
FIG. 1 is a perspective view of apparatus for curing adhesive bonds according to one embodiment of the invention, and showing a rotor blade clamped for curing.
Figure 2:
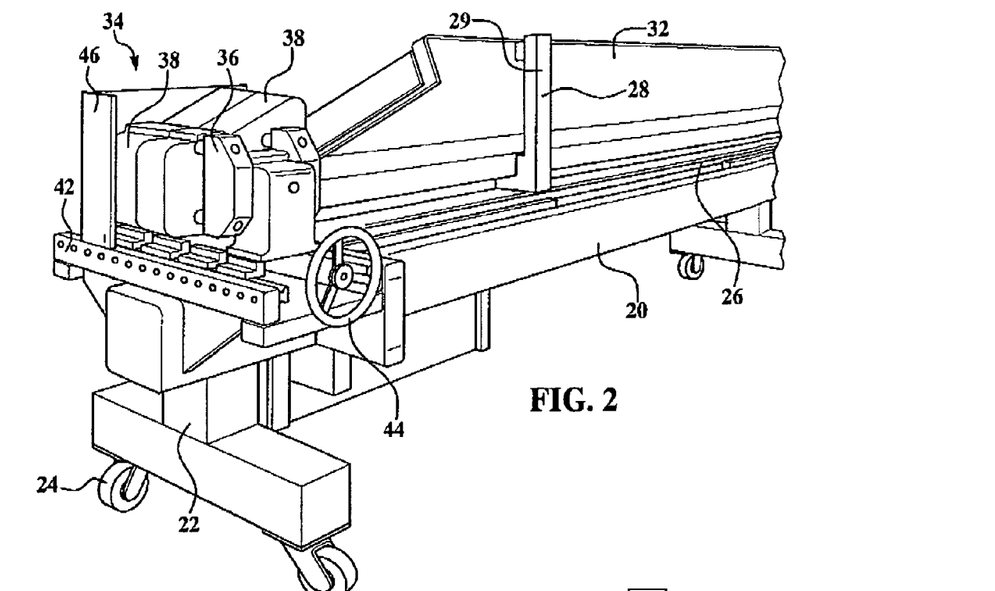
FIG. 2 is a perspective view of one end of the apparatus shown in FIG. 1.
Figure 3:
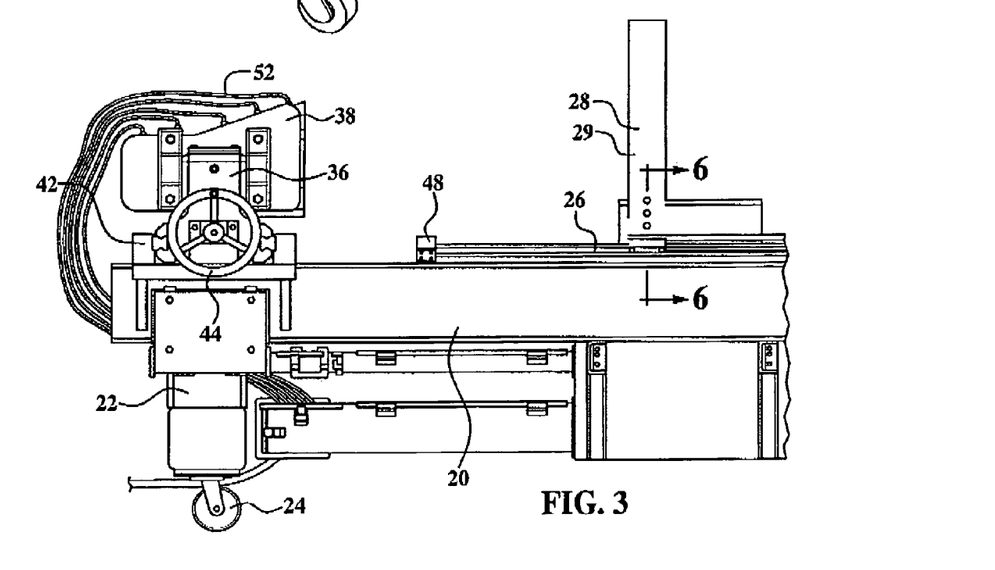
FIG. 3 is a fragmentary, side view of one end of the apparatus shown in FIG. 1.
Figure 4:
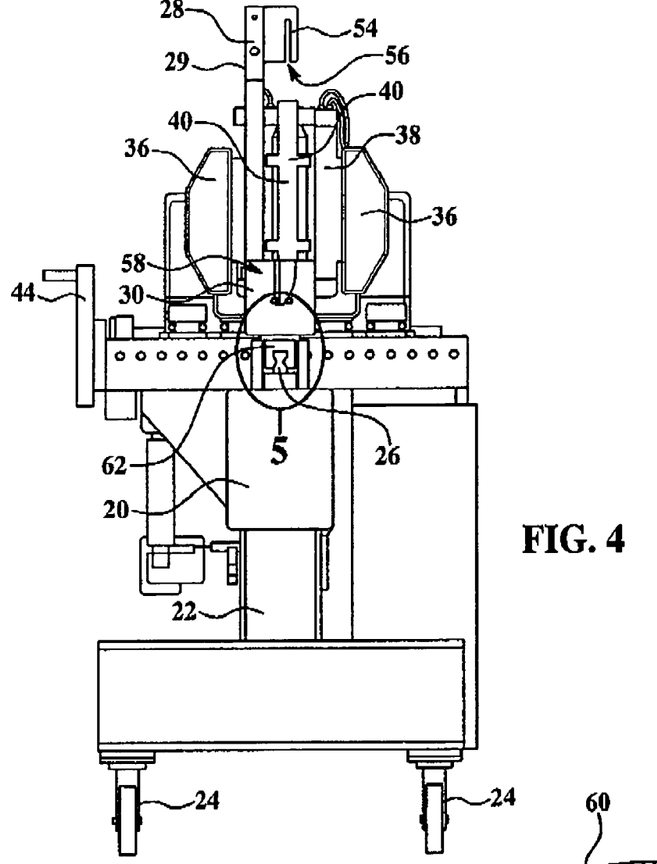
FIG. 4 is an elevational view of the other end of the apparatus shown in FIG. 1.
Figure 5:
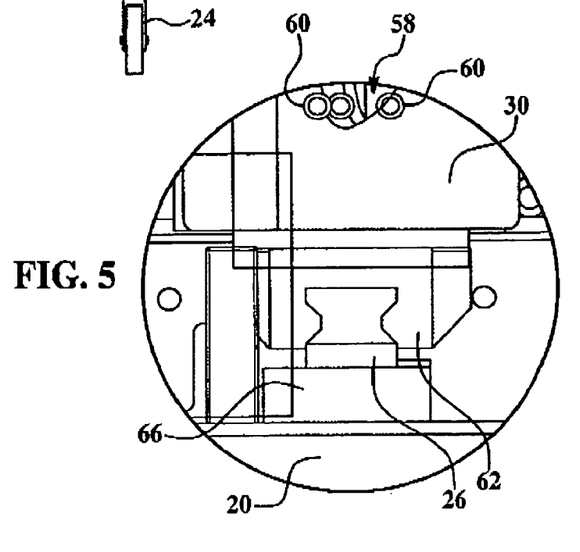
FIG. 5 is an enlarged view of the section designated as "A" in FIG. 4.
Figure 6:
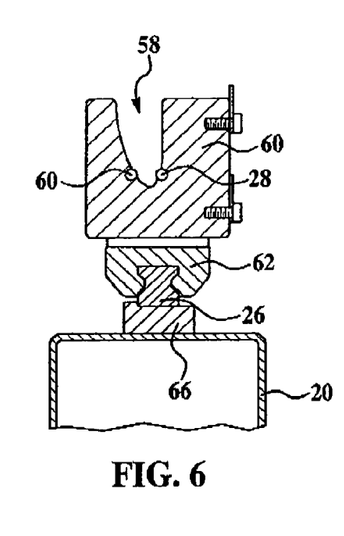
FIG. 6 is a sectional view taken along the line 6-6 in FIG. 3.
Figure 7:
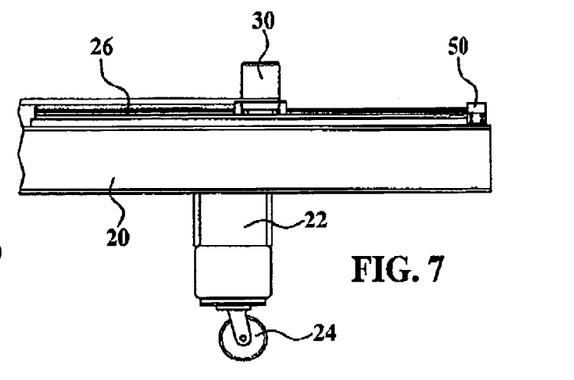
FIG. 7 is an elevational view of an end of the apparatus shown in FIG. 1, opposite the end shown in FIG. 3.
Figure 8:
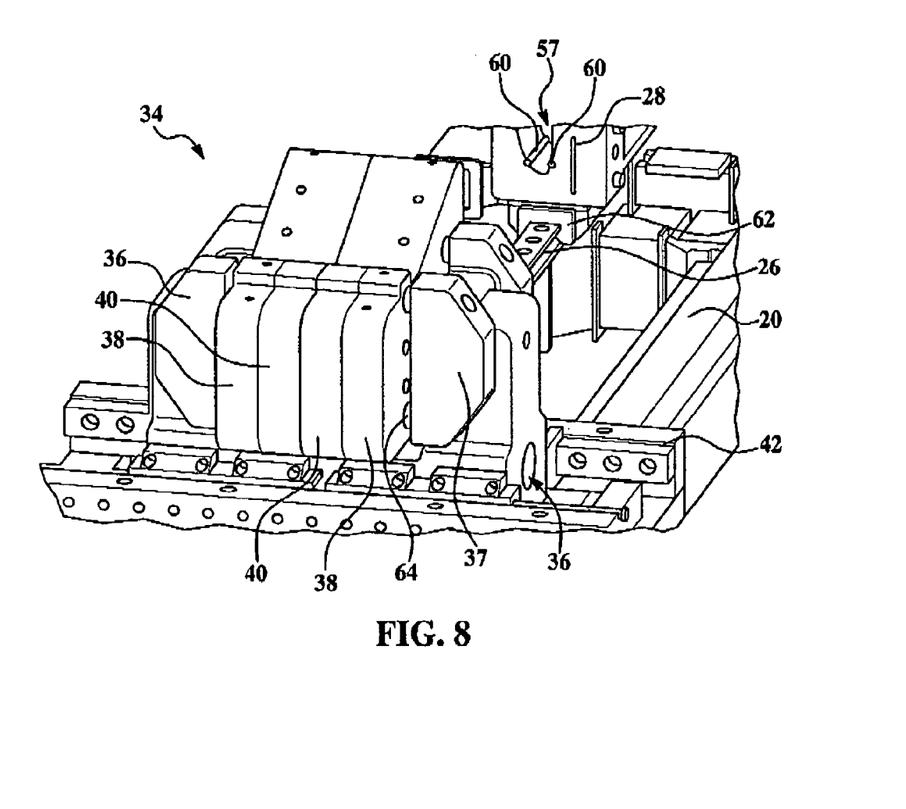
FIG. 8 is an enlarged, perspective view of one end of the apparatus, better depicting details of the clamping assembly.

Similarly, as shown in FIG. 8, the lower portion of the support 28 includes an opening 57 contoured to complementary receive an edge of the rotor blade 32, and is also provided with locating pins 60 which assist in locating the blade edge at the bottom of the opening 57. Support 28 further includes a vertical arm 29 having a support member 54 provided with an opening 56 which is contoured to complementary receive the upper edge of the blade 32. Thus, it can be appreciated that the support holds the rotor blade 32 so that the plane of the blade is vertically oriented.

A clamping assembly generally indicated by the numeral 34 functions to both compact the bonding area through the application of pressure, and heat cure the bond area, thus eliminating the need to transport the entire blade 32 to a large furnace in order to carry out the curing process. The clamping assembly 34 includes a pair of clamping members 36, a pair of heated shoes 38, and a pair of tool members 40 which are configured to engage and apply pressure to opposite faces of the rotor blade 32. The clamping assembly 34 is mounted for sliding movement on a pair of rails 42, along an axis that extends transverse to the central axis of the rail 26.

A twin lead screw 81 (FIG. 16) passes through openings 37 (FIG. 8) in the clamping members 36 and is held by one or more bearings 80 contained in the clamping members 36. The twin lead screw 81 comprises a single shaft having right hand threads on one half of the shaft, and left hand threads on the other half of the shaft. The two threaded halves of the shaft are respectively threadably received by the two clamping members 36 which effectively "float" on the rails 42, so as to self align with each other and apply equal pressure on the clamped part. A hand wheel 44 is secured to one end of the lead screw 81 which allows manual rotation of the lead screw to cause the clamping members, along with their respectively associated shoes 38 and tool members 40 to move toward or away from each other, between an open, standby position, and a closed, clamping position.

Figure 10:
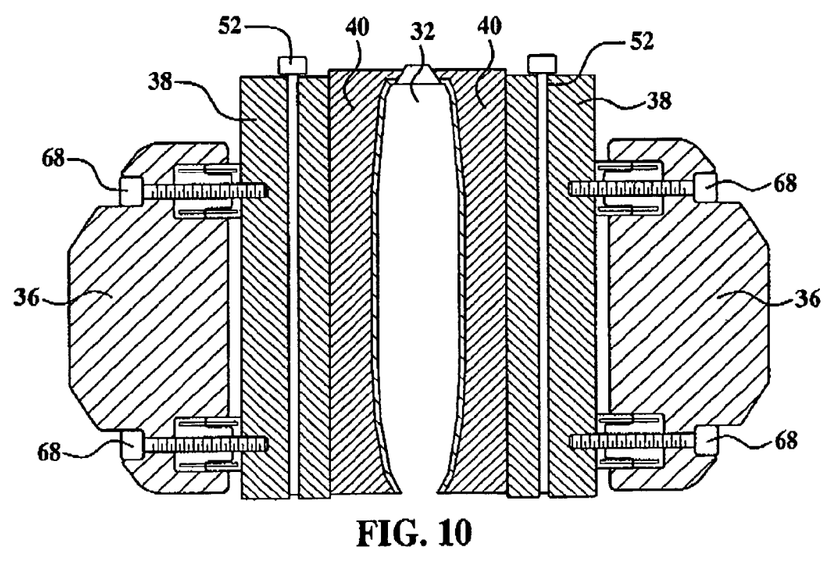
FIG. 10 is a vertical section view taken through the clamping assembly.
Figure 11:
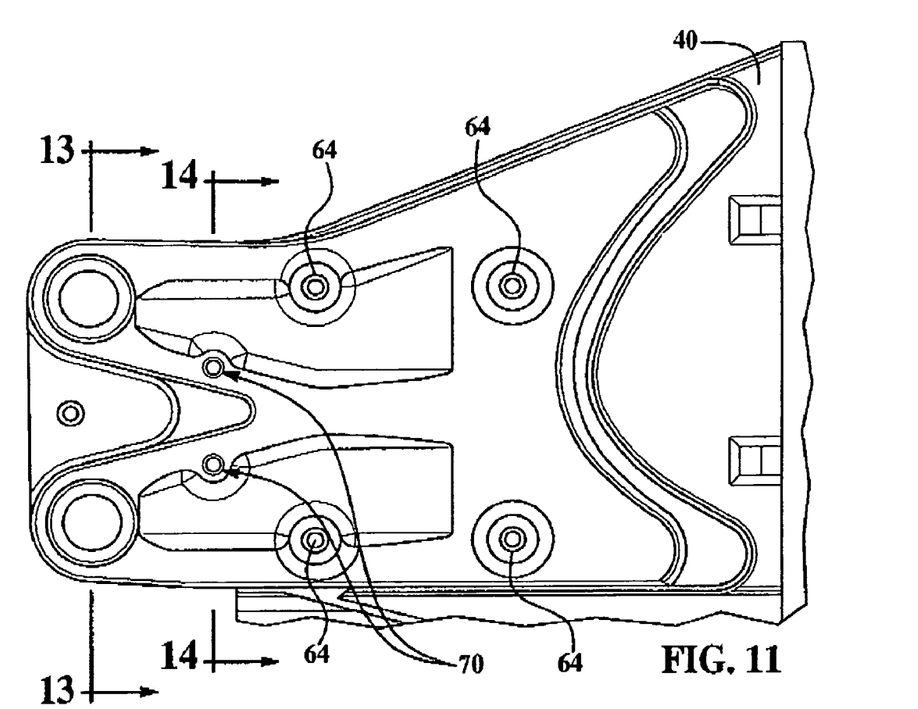
FIG. 11 is a side elevational view of one of the tool members.
Figure 12:
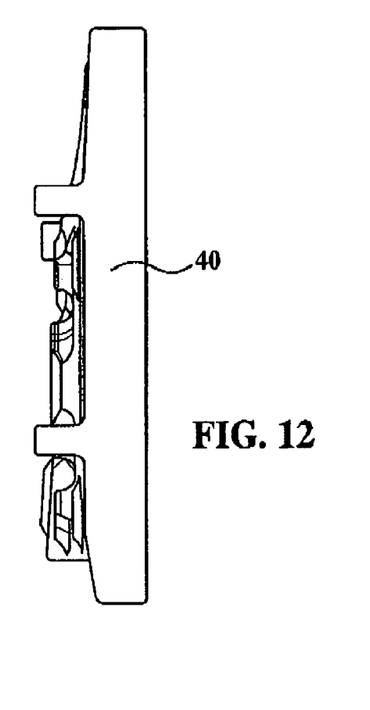
FIG. 12 is an end view of the tool members shown in FIG. 11.
Figure 13:
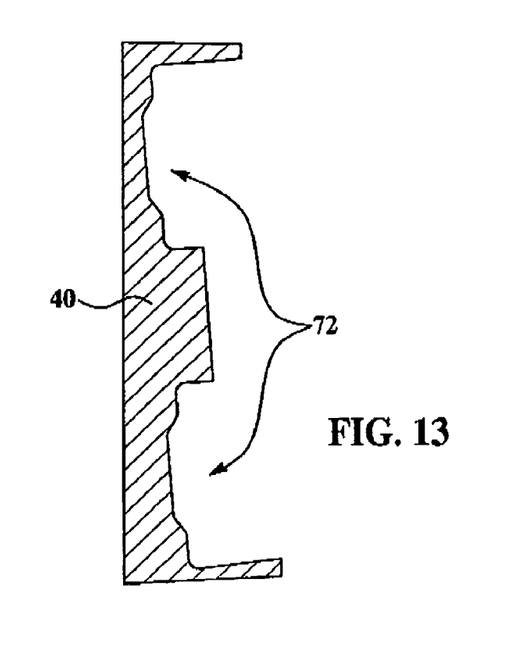
FIG. 13 is a sectional view taken along line 13-13 in FIG. 11.
Figure 14:
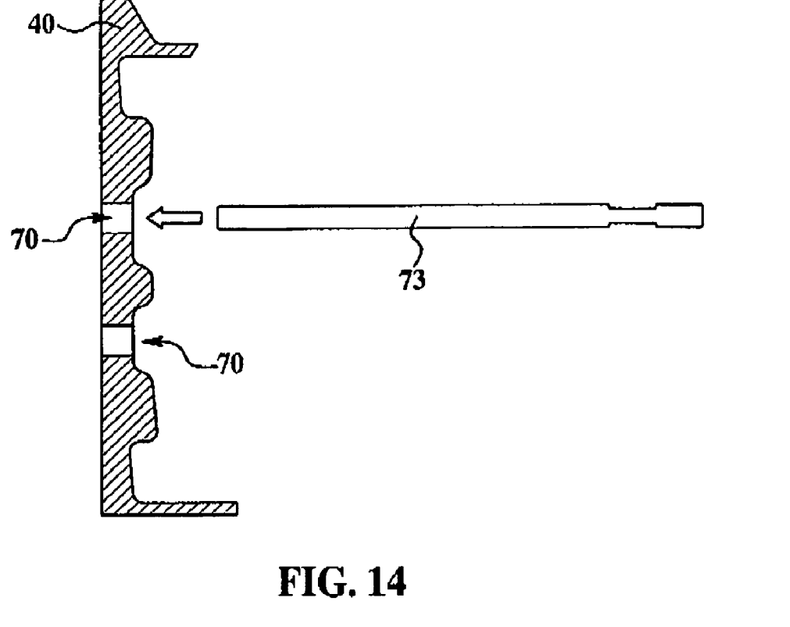
FIG. 14 is a sectional view taken along the line 14-14 in FIG. 11.

The clamping members 36, shoes 38 and tool members are held in aligned relationship with each other by four guide shafts 64 which are secured to the clamping members 36 and pass through openings provided in the shoes 38 and tool members 40. The openings in the tool members 40 can be seen in FIG. 11. As best seen in FIG. 10, the shoes 38 are secured respectively to the clamping members 36 by means of fasteners such as cap screws 68.

Figure 9:
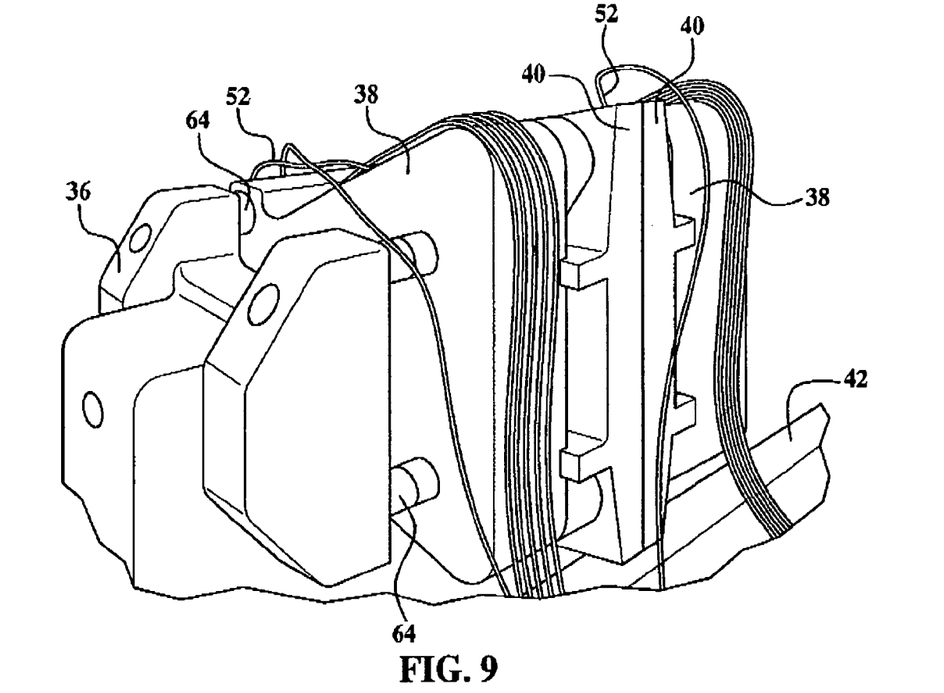
FIG. 9 is an enlarged perspective view of the clamping assembly in a clamped position.

As best seen in FIGS. 9 and 10, each of the shoes 38 is provided with multiple, electrical heating elements 52 which are received within openings in the shoes 38 and are connected to a suitable source of electrical power (not shown). The heating elements 52 heat the shoes 38 which are made of thermally conductive material such as steel or aluminum. Heat from the shoes 38 is conducted through the metallic tool members 40 so as to heat the rotor blade 32 to a temperature sufficient to result in curing of the bond area. A later discussed controller controls the heating elements 52.

Referring now to particularly to FIGS. 11-14, each of the tool members 40 has a contoured inner face configured to match the surface of the rotor blade 32 and the area of bonding, and may include features or depressions 72 to accommodate fasteners or other components (not shown). Tool members 40 may include through holes 70 for receiving locating pins 73 which also pass through openings (not shown) in the rotor blade as well as through the shoes 38, into the clamping members 36.

Figure 15:
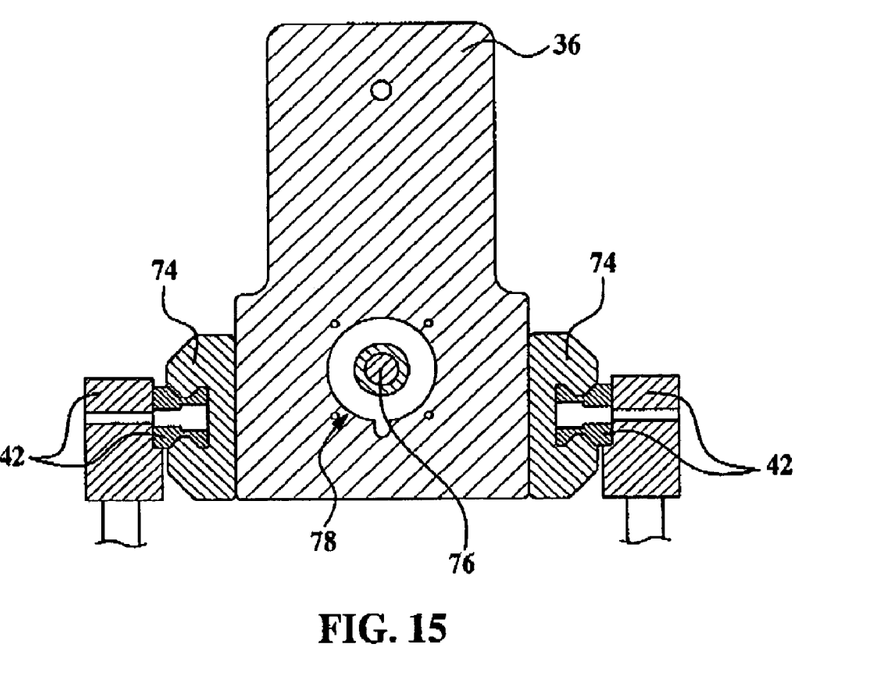
FIG. 15 is a vertical section taken through the clamping assembly and showing the slideable mounting of the clamping members.
Figure 16:
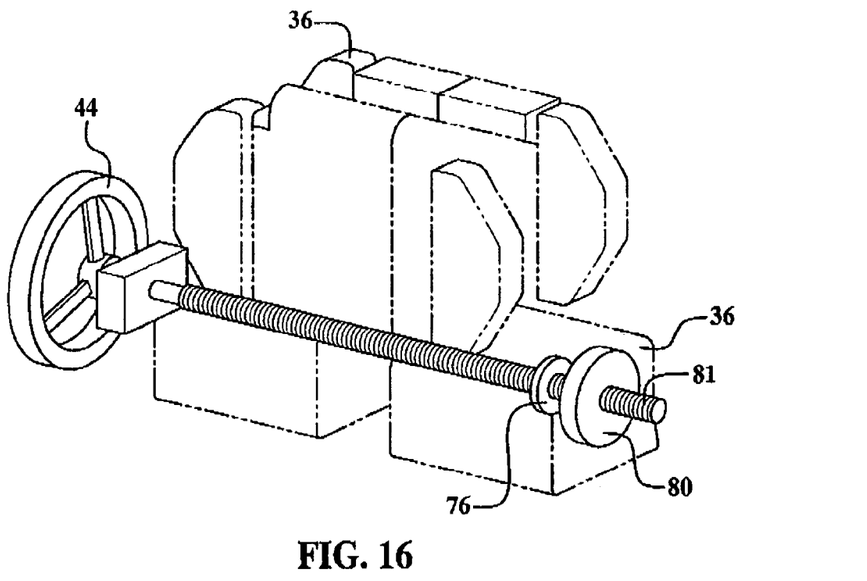
FIG. 16 is a perspective view showing the position of a lead screw and load cell forming part of the clamping assembly.

FIG. 15 shows how the rails 42 slideably mount the clamping members 36 using a pair of guide ways 74. An enlarged central opening 78 in the clamping member 36, surrounds the lead screw 76 and provides a space in which a pressure sensor in the form of a load cell 78 may be mounted. FIG. 16 shows the load cell 76 which includes a central opening through which the lead screw 81 may pass. Closing of the clamping members 36 results in pressure being exerted on the load cell 76 which produces an electrical signal related to the magnitude of the applied pressure.

Cooling means in the form of a later discussed fan may be mounted near the clamping assembly 34. In one embodiment, the fan is mounted inside a shroud 46 which may be removably secured to either the frame 20 or the rails 42. The fan is oriented so as to draw air across the clamping assembly 34 to promote cooling of the part after the curing cycle is complete.

Figure 17:
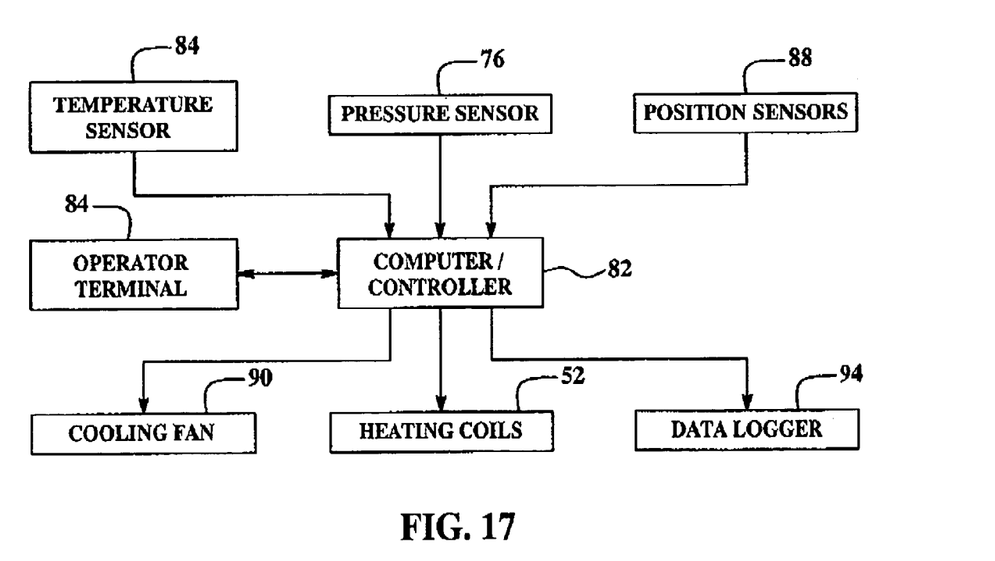
FIG. 17 is a simplified block diagram of the control system.

FIG. 17 depicts a control system used to automatically control various operations of the apparatus. The control system includes a computer based controller 82 which may be a PLC (programmable logic controller). The controller 82 may receive inputs from one or more temperature sensors 84, a pressure sensor 76 and position sensors 88. The temperature sensor 84 may be a commercially available device that is mounted in one or more locations on the heated shoes 38. The pressure sensor 76 comprises the previously discussed load cell shown in FIG. 16 or other pressure sensing device that produces an electrical signal related to the magnitude of the sensed pressure. Although not specifically shown in the drawings, one or more position sensors 88 may be mounted on the apparatus to confirm that both the part and the moveable components of the apparatus are in the proper positions before a curing cycle is initiated. An operator terminal 84 allows an operator to communicate with the controller 82 and receive operating information via an incorporated display (not shown).

The controller 82 controls the operation of the cooling fan 90 as well as the heating coils 52 based on a set of programmed instructions stored in a memory (not shown) forming part of the controller 82. These programmed instructions dictate the temperature to which the part is heated during curing cycle, and the length of the curing cycle. Upon completion of the curing cycle, the controller 82 turns off the heating coils 52 and energizes the cooling fan 90 in order to accelerate the cool down process. A data logger 94 may be provided either separately, or as part of the controller 82 in order to record curing cycle information, including temperature and pressure so that a record is made of the sensed parameters during the curing cycle for each part.

Figure 18:
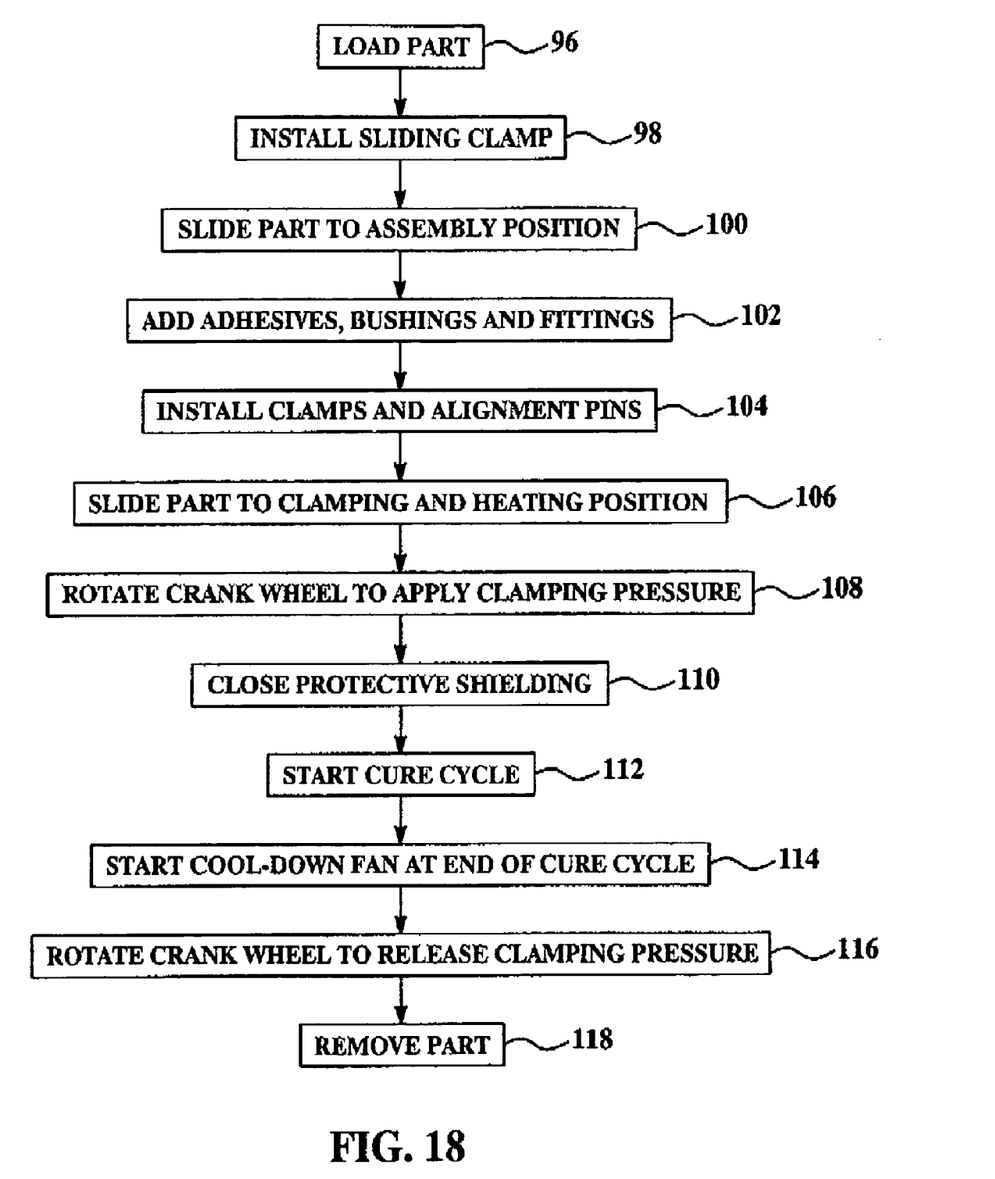
FIG. 18 is a simplified flow chart showing the basic steps used to carry out a method for adhesive bond curing in accordance with an embodiment of the invention.

Referring now to FIG. 18, a method for curing part bonds begins at step 96 in which the part, in this case rotor blade 32, is loaded onto the apparatus. The rotor blade 32 is first positioned on the part supports 28, 30. Next, at step 98, the upper arm 29 of support 28 is installed in order to maintain the vertical relationship of the blade 32 relative to the clamping assembly 34. The part is then displaced to an assembly position at step 100 where adhesives, bushings and fitting are applied to the part which are to be bonded. Then, at step 104, the guide shafts 64, and alignment pins 73 are installed along with the shoes 38 and tool members 40. At step 106, the operator slides the assembled part to a clamping and heating position, in which the area to be bonded is disposed between the tool members 40. At step 108, the operator rotates the crank wheel 41, causing the clamping members 36 to move toward each other, until the facing, contoured surfaces of the tool members 40 apply pressure to opposing faces of the part.

At step 110 protective shielding is installed, such as the shroud 46. At this point, the part and apparatus are ready to commence a curing cycle which is started at step 112. The operator initiates the cure cycle using terminal 84 to communicate with the controller 82. Controller 82 energizes the heating coils 52 and monitors the temperature of the shoes 38 based on signals received from the temperature sensor 84. When the shoes 38 have reached the required curing temperature, the controller 82 logs the duration of the curing cycle and when the cycle is complete, the controller 82 de-energizes heating coils 52. The controller then energizes the cool down fan 90, as shown at step 114 in order to accelerate cooling of the part. When the part is sufficiently cool, the operator rotates the crank wheel 44 to release the clamping pressure, as shown at step 116. The crank wheel 44 is rotated until the part clears the tool members 40. At this point, the operator may slide the part back to its loading position, where it is removed at step 118.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of curing a laminated resin part comprising:
   loading the part onto a support;
   sliding the support having the part thereon along a first axis from a part loading position to a part curing position;
   assembling a reinforcement layer of resin material and a fitting to a pre-selected portion of the part, the pre-selected portion of the part being less than an entirety of the part;
   applying a pressure to the pre-selected portion of the part by moving a pair of clamps along a second axis transverse to the first axis from a standby position to a clamping position in which the clamps engage opposing faces of the pre-selected portion of the part;
   heating the pre-selected portion of the part via the clamps to cure the pre-selected portion of the part to bond the reinforcement layer of resin material or the fitting to the part;
   cooling the pre-selected portion of the part after the pre-selected portion of the part has been cured via a cooling fan; and
   releasing the pressure applied to the pre-selected portion of the part after the pre-selected portion has cooled by moving the clamps from the clamping position to the standby position.

2. The method of claim 1, further comprising:
   sliding the support from the part curing position to the part loading position after the pressure applied to the pre-selected portion is released; and
   unloading the part from the support.

3. The method of claim 1, further comprising
   sensing a temperature of the pre-selected portion of the part;
   measuring a time that the pre-selected portion of the part remains heated to at least a cure temperature; and
   terminating heating of the pre-selected portion when the time measured is at least a predetermined value indicating that the pre-selected portion of the part has cured.

4. The method of claim 3, further comprising automatically performing, via a controller, heating the pre-selected portion, cooling the pre-selected portion of the part after the pre-selected portion of the part has been cured, and terminating heating of the pre-selected portion.

5. The method of claim 3, wherein cooling the pre-selected portion of the part after the pre-selected portion of the part has cured comprises automatically turning on the cooling fan when heating of the pre-selected portion has been terminated.

6. A method of claim 1, wherein moving the pair of clamps along the second axis comprises manually moving the pair of clamps via a single shaft having right hand threads on one portion of the shaft and left hand threads on another portion of the shaft so that rotation of the shaft in a first direction causes the pair of clamps to move in opposite directions along the second axis.

7. The method of claim 1, further comprising detecting, via a pressure sensor, the pressure applied to the pre-selected portion of the part by the pair of clamps.

8. The method of claim 1, wherein assembling the fitting to the pre-selected portion of the part comprises bonding the fitting to the pre-selected portion of the part via the reinforcement layer of resin material.

9. The method of claim 8, wherein the part is a rotor blade of a helicopter and further comprising attaching the rotor blade to a drive shaft of the helicopter via the fitting bonded to the pre-selected portion of the part.

10. A method comprising:
positioning a material part on a support that is movable relative to a frame along a first axis between a part loading position and a part curing position, the support having a surface that is substantially parallel relative to the first axis;
maintaining the part between an arm and the support, the arm extending from the support in a non-parallel direction relative to the first axis, the support and the arm to prevent movement of the part in a first direction substantially perpendicular relative to the first axis;
sliding the support to the part curing position along the first axis;
assembling a reinforcement layer of resin material or a fitting to a pre-selected portion of the part, the pre-selected portion of the part being less than an entirety of the part; and
clamping opposing faces of the pre-selected portion of the part via opposing clamps movable along a second axis that is transverse relative to the first axis, the clamps having respective clamping surfaces to engage respective ones of the opposing faces of the pre-selected portion, the clamping surfaces being non-parallel relative to the surface of the support.

11. The method of claim 10, further comprising heating the pre-selected portion of the part via the clamps to cure the pre-selected portion of the part.

12. The method of claim 11, further comprising cooling the pre-selected portion of the part after the pre-selected portion has cured.

13. The method of claim 10, wherein positioning the part on the support comprises positioning the part on the support such that the opposing faces of the pre-selected portion of the part are substantially parallel relative to the clamping surfaces of the clamps.

14. The method of claim 10, further comprising maintaining the pre-selected portion of the part in a substantially vertical relationship relative to respective clamping surfaces via the support and the arm.

15. A method comprising:
positioning a part on a support of a frame, the support to slide the part relative to the frame between a loading position and a curing position;
adding a layer of fiber reinforced resin material over a portion of the part;
moving opposing clamps from a standby position to a part clamping position to apply a pressure to the portion of the part having the layer of fiber reinforced resin material; and
heating the portion of the part via the clamps to bond the fiber reinforced resin material to the part when the clamps are in the clamping position.

16. The method of claim 15, further comprising cooling the clamps to cool the part after the layer of fiber reinforced resin material is bonded.

17. The method of claim 16, further comprising moving the clamps to the standby position after the part has cooled.

18. The method of claim 15, further comprising adding a fitting to the portion of the part prior to moving the clamps to the clamping position, wherein heating the portion of the part bonds the fitting to the portion of the part via the fiber reinforced resin material.

19. The method of claim 18, wherein the part comprises a rotor blade and further comprising attaching the rotor blade to a drive shaft of an aircraft via the fitting.

20. The method of claim 15, wherein the layer of fiber reinforced resin material comprises a carbon fiber reinforced epoxy laminated structure.

21. The method of claim 15, wherein the part comprises laminated layers of fiber reinforced resin matrix in which multiple plies of a woven or knitted fabric or tape are layered upon each other.

* * * * *